US006771294B1

(12) United States Patent
Pulli et al.

(10) Patent No.: US 6,771,294 B1
(45) Date of Patent: Aug. 3, 2004

(54) USER INTERFACE

(76) Inventors: Petri Pulli, Impolankuja 2 A 52, FIN-90570 Oulu (FI); Peter Antoniac, Peltolantie 8 D 45, FIN-90210 Oulu (FI)

(*) Notice: Subject to any disclaimer, the term of this patent is extended or adjusted under 35 U.S.C. 154(b) by 0 days.

(21) Appl. No.: 09/473,709

(22) Filed: Dec. 29, 1999

(51) Int. Cl.[7] .................................................. G09G 5/00
(52) U.S. Cl. ....................... 345/863; 345/173; 345/835; 345/764; 345/810
(58) Field of Search ................................. 345/863, 835, 345/764, 810, 173, 155, 156

(56) References Cited

U.S. PATENT DOCUMENTS

| 5,319,747 | A | * | 6/1994 | Gerrissen et al. ........... 345/155 |
| 5,381,158 | A | * | 1/1995 | Takahara et al. ............ 345/156 |
| 5,677,700 | A | | 10/1997 | Schwalba et al. |
| 5,790,104 | A | * | 8/1998 | Shieh ......................... 345/173 |
| 6,111,580 | A | * | 8/2000 | Kazama et al. ............. 345/764 |
| 6,346,929 | B1 | * | 2/2002 | Fukushima et al. ......... 345/156 |

OTHER PUBLICATIONS

Sasaki, H., Kuroda, T., Chihara, K., "Hit–Wear: an Input Interface for Wearable Computers Utilizing Visual Feedback and Physical Sense," Correspondence on Human Interface, vol. 1, No. 4, no date.

Kalawsky, Roy S., "The Science of Virtual Reality and Virtual Environments," Addison–Wesley Publishers, Ltd, ISBN 0–201–63171–7, pp. 88–135, 188–197, 21–22 and 135–163, no date.

Akao, Yoji, "Quality Function Deployment: Integrating Customer Requirements into Product Deisgn," Productivity Press, Cambridge, MA, 1990, ISBN: 0–915299–41–0, pp. 6–7, 20 and 22.

* cited by examiner

Primary Examiner—Kristine Kincaid
Assistant Examiner—Mylinh Tran
(74) Attorney, Agent, or Firm—Pillsbury Winthrop LLP

(57) ABSTRACT

The invention relates to a method of using a portable mobile communication device such as mediaphone. In the method, an image of a hand of the user is made and the natural partition of the hand is recognized. An augmented reality image of a user interface of the device is made by laying an image of a desired user interface comprising input segments onto the image of the user's hand in such a way that the segments of the user interface are separated from each other by the natural partition of the hand. The augmented reality image of the user interface is seen by the user, who selects a desirable segment by touching a partition on the hand. The selection on the hand is recognized and a function related to the selected segment is performed by the device. MARISIL is defined and used to operate this class of devices.

39 Claims, 11 Drawing Sheets

USER INTERFACE

BACKGROUND OF THE INVENTION

One of the most important factors contributing to the effective use of a computer and phone devices is the interface between a human and a device. The most popular human—computer interface is a keyboard. A commonly used computer keyboard has nearly 100 keys in order to facilitate the user input, and it is based on a matrix of electrical switches that are called keys. A keyboard for small devices has a reduced size and the keys have a special property. Pressing a key more than once produces a different action on the interface. Although such keyboards are commonly used and widely accepted, they do not often provide a very efficient or easy way to use electronic devices.

Mobile devices, such as cellular phones or palm top computers, have become very popular in the last few years. These devices are hand-held and they are provided with a keyboard for user input and with a display for showing the results of the inputs. However, users do not always want to carry mobile devices in their hands, nor is it always easy to input data into the devices.

A prior art arrangement to avoid the use of a keyboard is disclosed in "HIT-Wear": Input Interface for Wearable Computers Utilizing Visual Feedback and Physical Sense by Sasaki, H., Kuroda, T., Chihara, K. in Correspondence on Human Interface, Vol. 1, No. 4, which is incorporated herein by reference. In this arrangement, a hand is placed in front of the face and the device identifies the fingertips. The user is wearing a head-mounted display, which shows him a menu related to the use of the device, such that one function key of the menu is displayed outwards from each fingertip. When the user touches a particular key, the corresponding function is carried out. However, a drawback of the arrangement is that even though it enables rapid selection of a desired command or operation, only a few commands or operations can be shown at a time to the user. Another drawback is that the arrangement is not really suitable for inputting alphanumerical or other symbolic data.

SUMMARY OF THE INVENTION

An object of the invention is to provide a method and a device implementing the method, such that augmented reality can be used to realize a compact user interface in a matrix form, with which interface commands and symbolic data can be input into the device in a simple manner. This is achieved with a method disclosed in the introduction of using a portable mobile communication device, the method comprising: forming an image of a hand of the user and recognizing the natural partition of the hand; forming an augmented reality image by overlaying an image of a desired user interface on the image of the hand recognized visually by the user; selecting a desired segment by touching a suitable partition on the hand; recognizing the selection on the hand; and performing a function related to the segment in the device.

The invention also relates to a method of using a portable mobile communication device, the method comprising: forming an image of a hand of the user and recognizing the natural partition of the hand; forming an augmented reality image of a user interface of the device by overlaying an image of a desired user interface on the image of the hand; showing a user the augmented reality image of the user interface; selecting a desired segment by touching a suitable partition on the hand; recognizing the selection on the hand; and performing a function related to the segment in the device.

The invention further relates to a portable mobile communication device comprising a video camera unit, a display unit, a transceiver unit and a digital signal processing unit that is arranged to control the operation of the portable mobile communication device: wherein the video camera is arranged to form a video image of a user's hand and to feed the image into the digital signal processing unit, which is arranged to recognize the natural partition of the hand in the video image; the digital signal processing unit is arranged to feed an image of a user interface into the display and to form an augmented reality image of the user interface of the device by overlaying an image of a desired user interface on the image of the user's hand seen by the user; a desired segment is selected by the user by touching a suitable partition on the hand; the digital signal processing unit is arranged to recognize the selection on the hand; and the device is arranged to perform a function related to the segment.

The invention also relates to a portable mobile communication device comprising a video camera unit, a display unit, a transceiver unit and a digital signal processing unit that is arranged to control the operation of the portable mobile communication device, wherein: the video camera is arranged to form a video image of a user's hand and to feed the image into the digital signal processing unit, which is arranged to recognize the natural partition of the hand in the video image; the digital signal processing unit is arranged to form an augmented reality image of a user interface of the device by overlaying an image of a desired user interface on the image of the user's hand; the digital signal processing unit is arranged to feed the augmented reality image of the user interface into the display, which is arranged to show the image to the user; a desired segment is selected by the user by touching a suitable partition on the hand; the digital signal processing unit is arranged to recognize the selection on the hand; and the device is arranged to perform a function related to the segment.

The invention further relates to a portable mobile communication device comprising a virtual reality gloves unit, a position tracking unit, a display unit, a transceiver unit and a digital signal processing unit that is arranged to control the operation of the portable mobile communication device, wherein: the virtual reality gloves are arranged to feed information on the user's hand into the digital signal processing unit, which is arranged to form an image of the hand and to recognize the natural partition of the hand; the digital signal processing unit is arranged to form an augmented reality image of a user interface of the device by overlaying an image of a desired user interface on the image of the user's hand; the digital signal processing unit is arranged to feed the augmented reality image of the user interface into the display, which is arranged to show the image to the user; a desired segment is selected by the user by touching a suitable partition on the hand; the digital signal processing unit is arranged to recognize the selection on the hand; and the device is arranged to perform a function related to the segment.

The preferred embodiments of the invention are disclosed in the dependent claims.

An essential feature of the invention is that the user interface is implemented without any actual physical element. The actual physical part of the user interface is replaced by the user's own hand. The portable electronic device is operated by pointing at input segments which are shown on the user's hand. This operation is implemented by means of augmented reality where an image of the hand seen by the user is supplemented with a display for the information of the user interface. The user interface information includes the menu and the results, which are visible to the user in the form of segments. The segments are preferably displayed on the hand according to the symbolic partition of the hand, i.e. how the contours of the hand and the joints of the fingers divide the hand into symbolic sectors.

The method and the system according to the invention provide several advantages. Even though a physical user interface is not needed to carry out the functions of the device, it is possible to utilize the input of symbolic or alphanumerical data or data based on other characters. When numerals or symbols are used, the operation of the device is independent of the user's language.

BRIEF DESCRIPTION OF THE DRAWINGS

The invention will be described below in more detail in connection with preferred embodiments with reference to the attached drawings, in which FIG. 3B shows a user interface that is visible to the user, FIG. 3D shows a user interface disabled by the user.

DETAILED DESCRIPTION OF THE PREFERRED EMBODIMENTS

Figure 1:
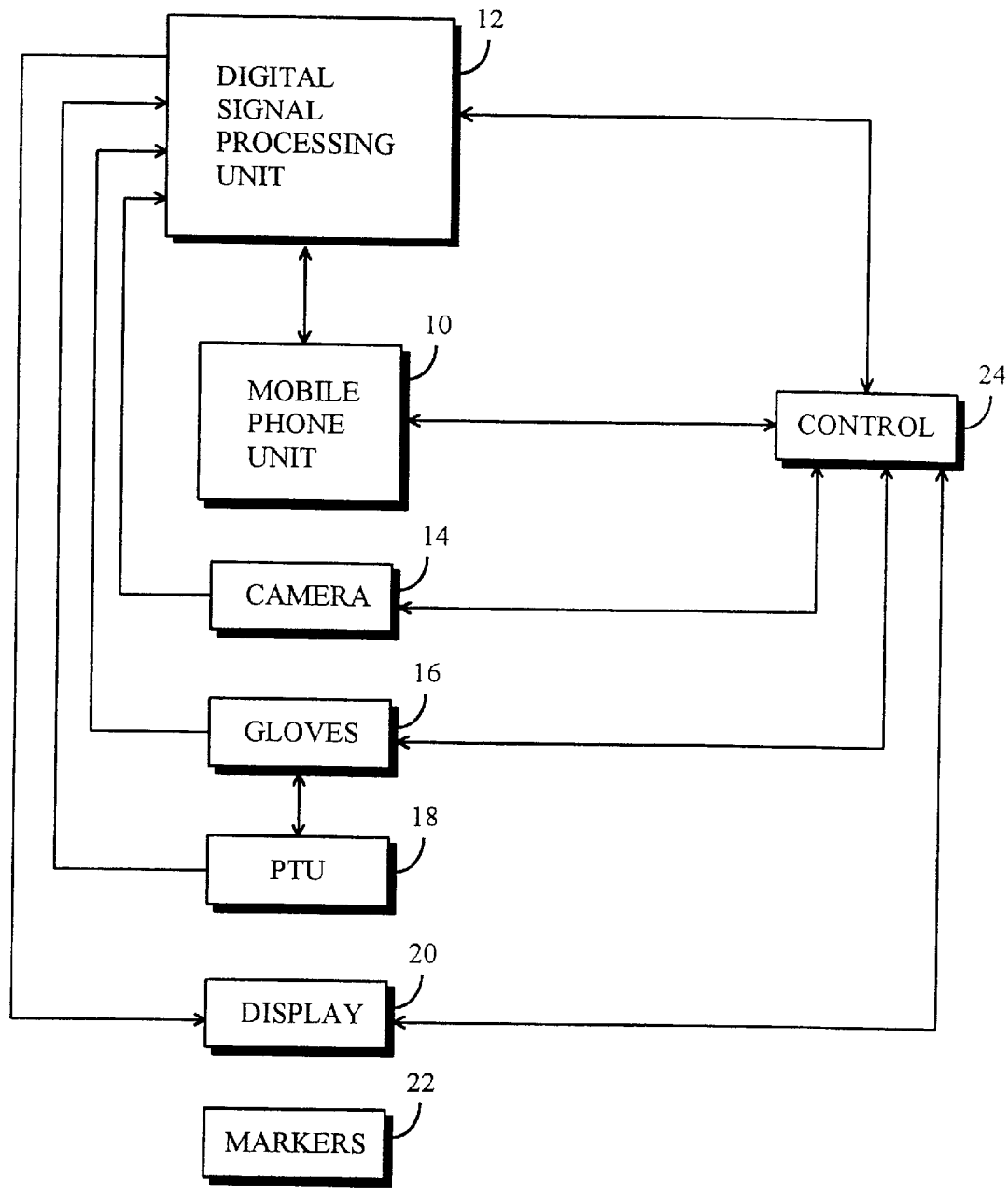
FIG. 1 shows a block diagram of the device.

The present invention can be applied as a user interface between mobile hand-held devices and a user. The arrangement provides easier access to information and facilitates browsing. The arrangement according to the invention is based on augmented reality (AR), which can be implemented by means of a video camera, a head-mounted display (HMD) (such as AR glasses) and a pointer.

The inventive interface is based on augmented reality. The basic idea is that the user sees a matrix of information segments overlayed on the image of his hand and the user is able to interact with the contents of the matrix by touching the matrix segments that are superimposed on the image of the hand.

Examine at first a block diagram of the device. The device comprises a mobile phone unit 10, which comprises a transceiver, a digital signal processing unit 12, a camera unit 14, a unit of virtual reality gloves 16, a position tracking unit 18, a display 20, marker(s) 22 and a control unit 24. The mobile phone unit 10 represents a conventional mobile phone comprising a digital signal processing unit 12. In the arrangement according to the invention, the camera 14, the virtual reality gloves 16 and the position tracking unit 18 are alternative components of the device. The camera unit 14, which comprises at least one camera, or units 16 and 18 produce information about the user's hand for the formation of an image of the user interface and the hand. The display 20 shows the user at least the image of the user interface, which is visible to the user as superimposed on the hand. There can be one marker 22 or many markers 22 that can be active or passive. Markers are used to help to mark and detect a certain part of the hand. A marker can be passive and then it is detected by the camera. A marker can also be active when it transmits a signal (i.e. electromagnetic signal or acoustic signal) to the position tracking unit. The entire device is controlled by the control unit 24.

Figure 2A:
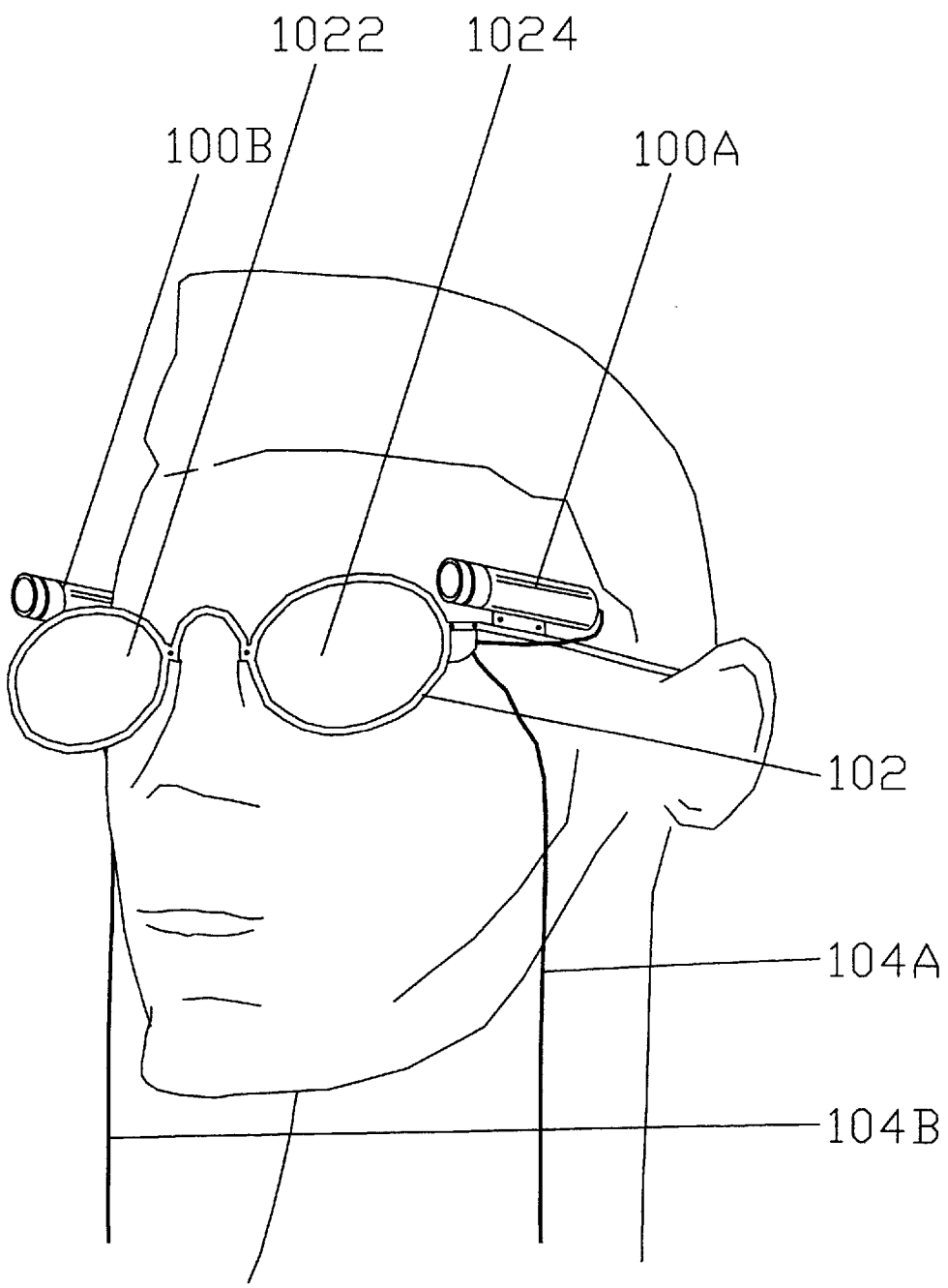
FIG. 2A shows camera and display units of the device.

FIG. 2A shows the units of the device which are related to the invention and which form an image of the user's hand. Cameras 100A and 100B film the space in front of the user's face where the hands are usually situated. Instead of two cameras it is also possible to use only one camera. The cameras 100A and 100B are preferably conventional CCD cameras or the like, where the detecting surface is a matrix consisting of pixels. The cameras are preferably colour cameras, but it is also possible to use monochrome cameras in the arrangement according to the invention. The location of the user's hand is monitored in the digital signal processing unit from an image formed by the camera(s). The user forms an image of his hand with his own eyes after the rays of light originating from the hand have passed through a display 102. This viewed image of the hand is supplemented with augmented reality by means of the display 102, the augmented reality comprising an image of the user interface formed by the signal processing unit. Another alternative is that the images which have been formed by the cameras and supplemented with augmented reality in the digital signal processing unit are shown to the user by means of a head-mounted display 102. When the hand moves, the digital signal processing unit follows the movement in the image formed by the camera(s) and shifts the augmented reality similarly in order that the user sees the hand and the augmented reality moving at all times at the same relation to each another. Both the camera 100 and the display 102 are connected by a cable 104 to a mobile station, which comprises a digital signal processing unit for the images formed by the camera(s) and for the computer graphics of the augmented reality.

The interface comprises several options. Examine first full augmented reality interaction, where the interface comprises two small cameras 100A and 100B, which enable formation of a stereo image. The cameras are preferably installed in the user augmented reality eyeglasses 102. Low-resolution cameras can be used as the video cameras 100A and 100B. The augmented reality glasses 102 are a device that is based on laser technology and light reflection on a partially transparent surface. An image of the user interface is reflected as an augmented reality image from a reflector surface 1022 into the right eye, and the augmented reality, which consists of the image of the user interface, is reflected from a reflector surface 1024 into the left eye. Another alternative is that an image of the hand formed by camera 100B and supplemented with augmented reality is reflected from reflector surface 1022 into the right eye, and the image of the hand formed by camera 100A and similarly supplemented with augmented reality is reflected from reflector surface 1024 into the left eye. An image can be shown either in stereo (to both eyes) or mono (to one eye only). If the user cannot see straight through the AR glasses, the image that is shown to the user by the AR glasses 102 of the hand, the user interface and the surroundings preferably corresponds rather accurately to the image the user would see with his own eyes in the same situation. The eyeglasses for augmented reality are described in greater detail in The Science of Virtual Reality and Virtual Environments, Roy S. Kalawsky, Addison-Wesley Publishers Ltd., ISBN 0-201-63171-7, pages: 88–135, which is incorporated herein by reference. Since there are two cameras 100A and 100B, triangulation can be used in the digital signal processing to determine the distance to the hand when the angles of view of the cameras, the hand's location in the image of the cameras and the distance between the cameras are known. The contours of the hand are also determined in the digital signal processing in a manner known per se. This makes it easier to monitor the hand's movements and to adapt the image of the user interface to the image of the hand. The formation of the contours of the hand is described in greater detail in FIG. 6. Instead of the AR glasses 102, it is also possible to use an HMD (a visor display).

Figure 2B:
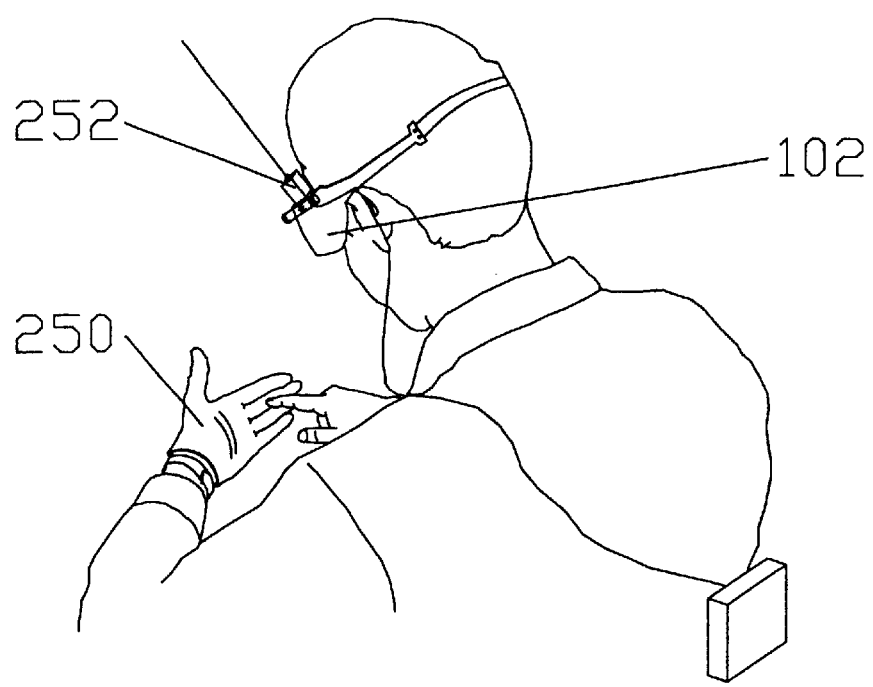
FIG. 2B shows image forming unit, gloves and display unit of the device

Instead of the full augmented reality interaction it is possible to use partial augmented reality interaction. FIG. 2B shows a device, which comprises a head-mounted display 102, virtual reality gloves 250 and a position tracking device 252. These are described in more detail in The Science of Virtual Reality and Virtual Environments, Roy S. Kalawsky, Addison-Wesley Publishers Ltd., ISBN 0-201-63171-7, pages: 88–135, pages: 188–197 and pages: 21–22 and 135–163, which are incorporated herein by reference. The position tracking device monitors the hand's movement and location, on the basis of which the image of the user interface is placed on the image of the hand. The HMD forms the augmented reality in the tracked positions of the hands with gloves.

Figure 2C:
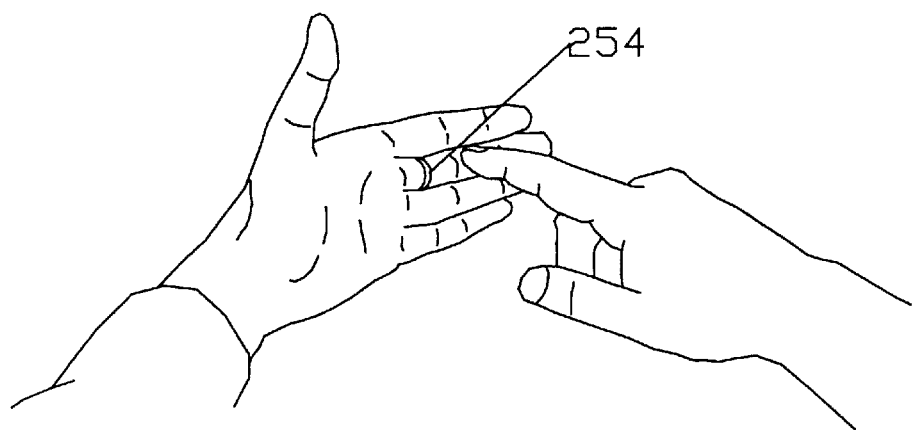
FIG. 2C shows a marker.

As shown in FIG. 2C, another alternative of implementing the partial augmented reality interaction is that the interface comprises a head-mounted display, similarly as the previous alternative, but instead of gloves the user wears a camera and has some location or position tracking markers 254 on the hands. The markers are not necessarily seen by the naked eye. The camera, however, detects the markers and the digital signal processing unit builds the interface over the image of the hand as in the previous cases. For example, the nail of the forefinger on the pointing hand can be painted with a strong colour. The colour is preferably such that it is clearly visible in the infrared zone, but it cannot be detected in visible light or by the naked eye. It is also possible to use a separate additional element or an ornament in the fingertip. Furthermore, a separate pointer element (such as a signal bar which resembles a pencil) can be used. Also, the hand which is the basis for the user interface can be made more noticeable for example by means of a ring or some other sign or ornament, since the pattern recognition process of the digital signal processing unit can identify it without problems. The left hand is useful as a basis of the user interface since most people already wear a ring on the ring finger and the pattern recognition process identifies the ring as a location marker.

Figure 3A:
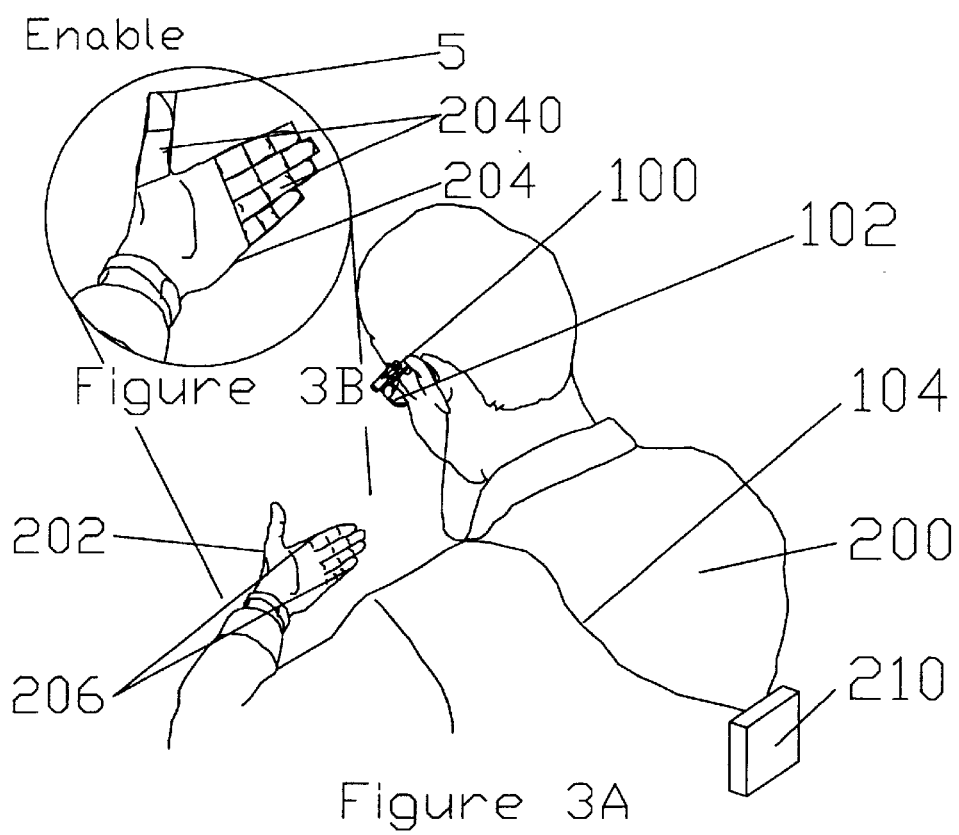
FIG. 3A shows a user looking at his hand.
Figure 3C:
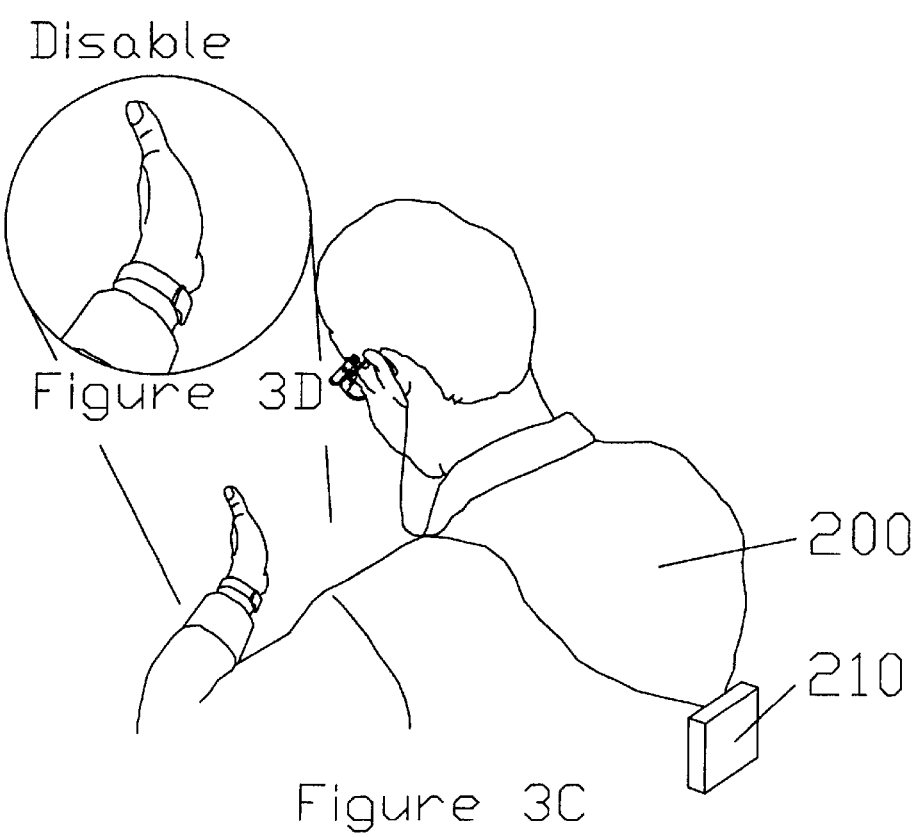
FIG. 3C shows a situation where the user has disabled the device.

Examine below in greater detail the method according to the invention with reference to FIGS. 3A, 3B, 3C and 3D. FIGS. 3A and 3C show how an outside observer sees the user 200 and the device. FIGS. 3B and 3D show how the user 200 sees his hand. The operation of the device is activated when the hand 202 is moved in front of the user 200 such that the perpendicular of the palm approximately faces the eyes of the user 200. In such a case the digital signal processing unit identifies the hand from an image formed by the camera. When the user 200 looks at his hand 202, he sees that the image 204 of his hand 202 formed either by his eyes or by the video camera 100 is superimposed by a menu or some other segmented information produced by the portable electronic device. Other people cannot see the information overlaid to the image 204 of the hand, since the information (menu) is not actually reflected in the hand 202 but it is formed on top of the image 204 of the hand produced either by the user's eye or by the video camera 100. When the user 200 can see the menu, he is able to point at a desired segment of the menu in his hand 202 for example with his finger in order to produce a desired function.

Moving the hand 202 sideways towards the video camera 100 erases the menu from view in FIG. 3D and prevents the use of the portable electronic device. FIGS. 3C and 3D show an example of how the operation of the device is prevented by turning the hand sideways so that the graphical image 2040 of a desired user interface cannot be laid over the hand. When the hand is positioned sideways, the result of the operation (or the menu) can be shown to the user 200 in the form of a matrix or table, and the information (information segments) are visible to the user 200 even if the hand 202 is positioned sideways. However, the portable electronic device cannot be used before the hand 202 is turned such that it forms the basis of the information to be shown. Removing the hand from the visual range of the video camera 100 stops the display operation of the portable electronic device. In such a case the digital signal processing unit no longer identifies the hand from the image formed by the camera.

In the method a video image 204 of a hand 202 of the user 200 is formed and the natural partition 206 of the hand is recognized. The natural partition of the hand means that the hand is divided mainly into parts 206 that are defined by the joints of the fingers and the outer contours of the hand. The forefinger, the middle finger, the ring finger and the little finger are each divided into three parts by the joints. The thumb is divided into two parts. Since the skin is creased at the joints, the locations of the joints can be identified as the borders of the parts by a graphics programme in the digital signal processing unit 210 of the device. The partition and the adaptation of the matrix segments are shown in greater detail in FIGS. 4A and 4B. An augmented reality image of a user interface of the device is formed by overlaying an image 2040 of a desired user interface on the image of the user's hand. The segments of the user interface are placed on the image of the hand in such a way that the segments of the user interface are separated from each other by the natural partition of the hand. In an embodiment of the invention, the user sees his hand through the display, which forms an image of the user interface over the image of the hand in the user's eye. In another embodiment of the invention the user does not see through the display, but before the image of the hand is shown to the user it is supplemented with the image of the user interface, and the augmented reality image of the hand and the user interface formed in this manner is shown to the user. The user can select any segment according to his will by touching a suitable partition on the hand. The signal processing unit 210 of the device recognizes the selection on the hand and performs the function related to the segment in the device.

Figure 3E:
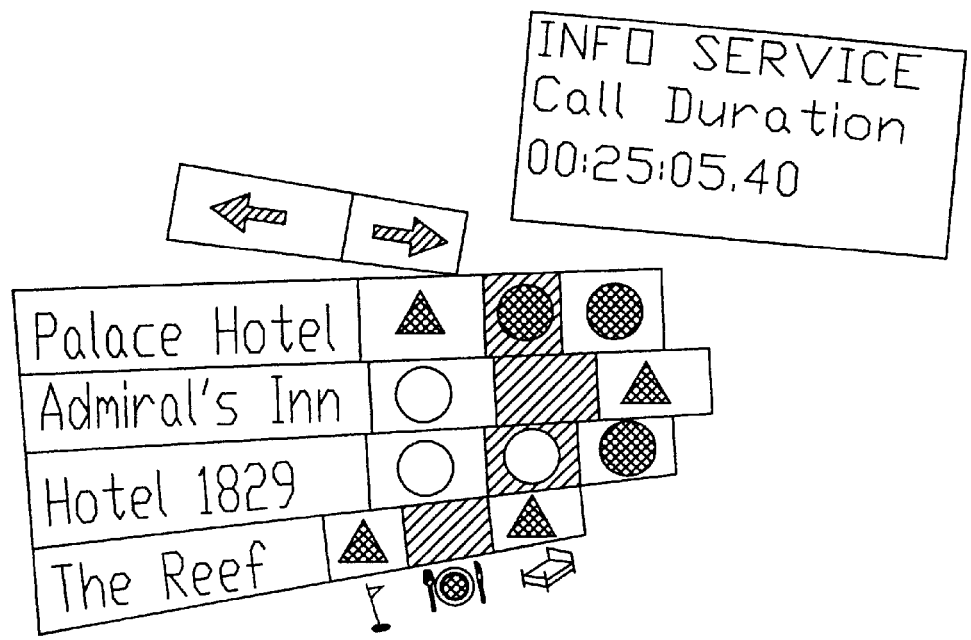
FIG. 3E shows a situation where a hand is not a basis of a user interface.

The user can also remove the hand and still be able to see the display as shown in FIG. 3E. In this way the user can see the interface in case he wants to see static or dynamic information that does not need interaction (i.e. pictures, movies, etc.).

The improved user interface is for a mobile device like a cellular telephone subscriber terminal or a palm top computer or any other handy device which has a processor and is light enough to be carried by a user. One example of these devices is mediaphone that is a portable device capable of transmitting and receiving speech, data and video images over wireless connection. The interface includes the following features: (1) a table browser interface based on a table-driven browser that enables a high information content in a small space; (2) an extended virtual display for use by hand, enabling a display of information for the user outside the area of the hand; (3) an unfixed panel based on the user's hands that enable input without making any distinction in handedness; (4) a sign language providing different browsing extensions for use in the interface in order to speed up the input and to make the use more ergonomic; (5) easy pointers for browsing the interface; (6) secrecy of user input; (7) easiness of updating for use in a flammable environment.

Figures 4A, 4B:
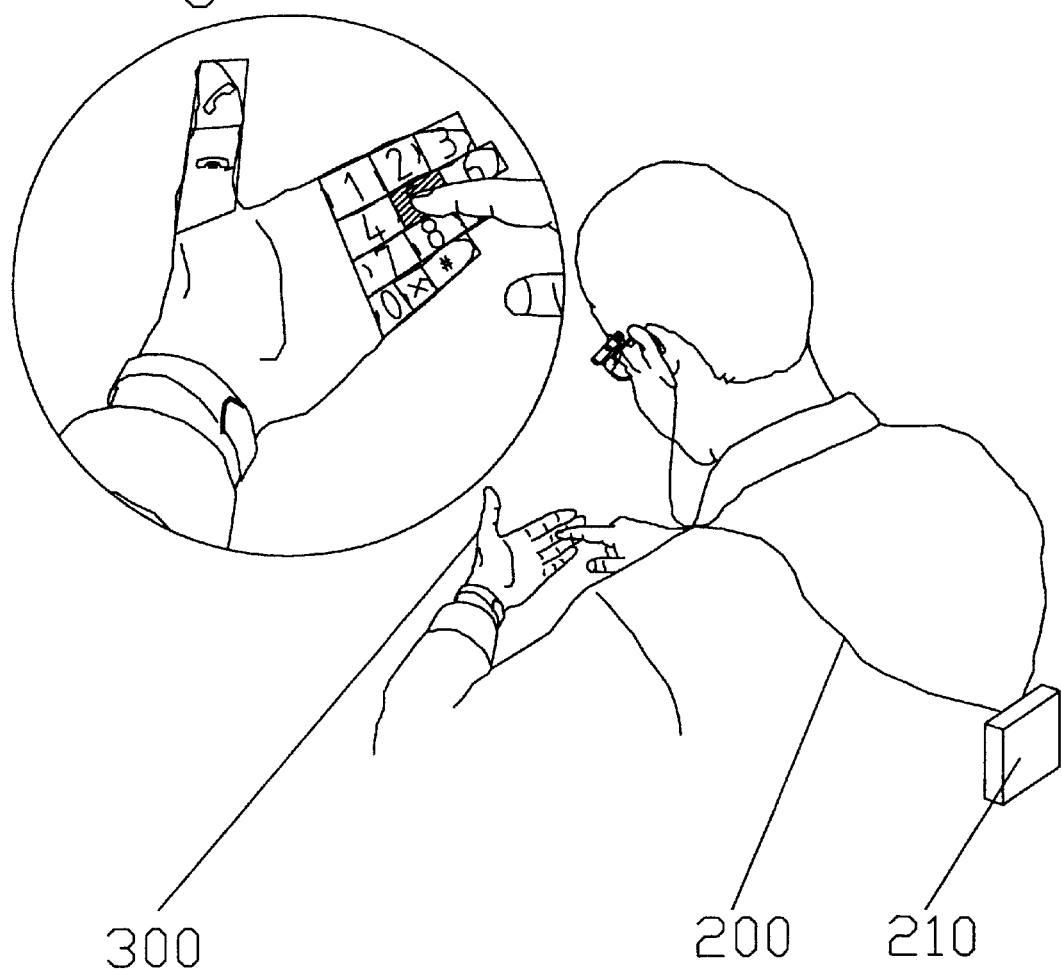
FIG. 4A shows a user selecting numbers.
FIG. 4B shows a situation seen by the user when he selects the numbers.

The table browser interface is based on a table-driven browser and the interface has a high information content in a small space. Examine this arrangement below with reference to FIGS. 4A and 4B. FIG. 4A shows how an outside observer sees the user 200 using the device, and FIG. 4B shows an image of the hand 300 seen by the user 200. When the four fingers of the hand 300 are together, an image of the fingers can be superimposed by an augmented reality matrix of 4×3 segments, which is adapted to the three parts of each finger. The matrix segments can be, for example, the number buttons and buttons * and # of the phone. The image of the thumb can be superimposed by an augmented reality image of start and end buttons for a call. Since the matrix rows are of different lengths similarly as the fingers, the different columns can be shown with different colours for the sake of clarity.

In the arrangement according to the invention, the user sees a segmented menu over the image of the hand, and he can select from the menu a desired function for example by pointing with a finger of the other hand. The segmentation follows the contours of the hand and is divided into parts similarly as the fingers are divided into parts by the joints. If the user wants to make a call, he can use one finger of his other hand or even the thumb of the same hand to point at the numbers shown over his four fingers. The numbers are visible between the joints in a similar manner as the numbers in a conventional phone can be selected from a 4×3 matrix. A call is started and ended by touching the symbols shown on the thumb. The numbers and the other information are visible on the hand as described above, since the graphics programme of the portable electronic device, which is known per se and therefore obvious to those skilled in the art, searches for the characteristic features of the hand's contours, such as the spaces between the fingers and the fingertips (the alignment marks are shown in the figure), and places the menu over the image of the hand. For example, when a finger of the other hand points at a function in the menu, the video camera detects the pointing finger and the graphics programme activates the desired function in the portable electronic device. The desired function is selected for example similarly as in a conventional telephone, i.e. for instance number 3 is pressed with a finger (the tip of the forefinger is pressed with a finger of the other hand or with the thumb of the same hand). Similarly, if the user wants to browse through messages, he presses the lower part of his palm (messages) with his finger, whereafter a message processing programme is activated in the same manner as in the prior art mobile phones. The portable electronic device identifies the location of the pointing finger on the hand, and the operation of the device can thus be controlled. Additional information relating to the call or some other operation can also be shown outside the field of image of the hand (e.g. the number to be dialled, the duration of the call, etc.).

Figure 5:
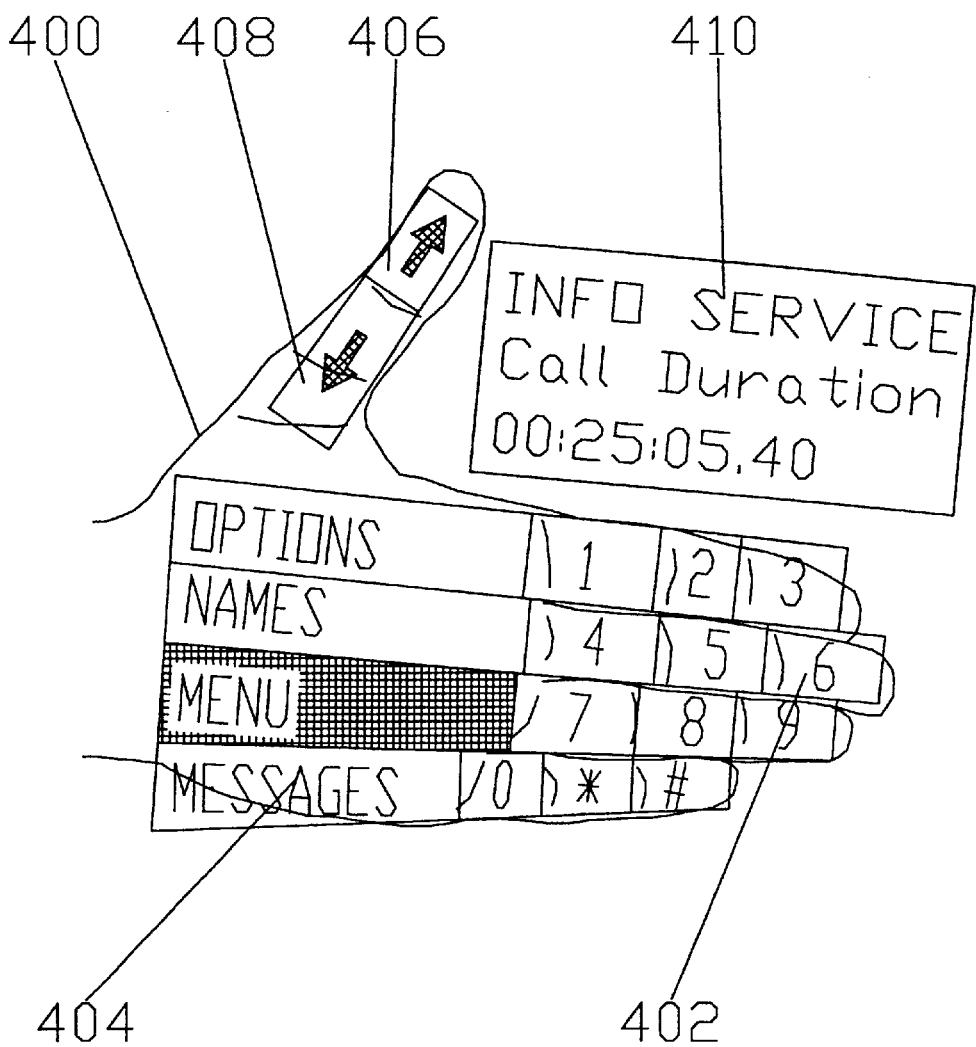
FIG. 5 shows selection segments visible on the hand.

FIG. 5 shows an arrangement where an image 400 of the hand is superimposed by an augmented reality image consisting of not only the number buttons 402 of the phone but also of selection option segments 404, which are restricted to the part of the fingers on the palm side and placed on the image of the palm. On the image of the thumb there are arrow keys 406 and 408, which can be used to select a suitable selection option in the up/down direction. In such a case the thumb is in an upright position. Other possible selection options include a person's name list, the general menu of the device, and the messages. The image seen by the user also comprises an extended virtual display 410. A virtual display 410 is linked to the hand so that it can be placed anywhere in space except on the hand. The display location is preferably situated between the thumb and the other fingers. The display will be enabled when the user requests for it or the application (device) needs it (like error, call etc).

Figure 6:
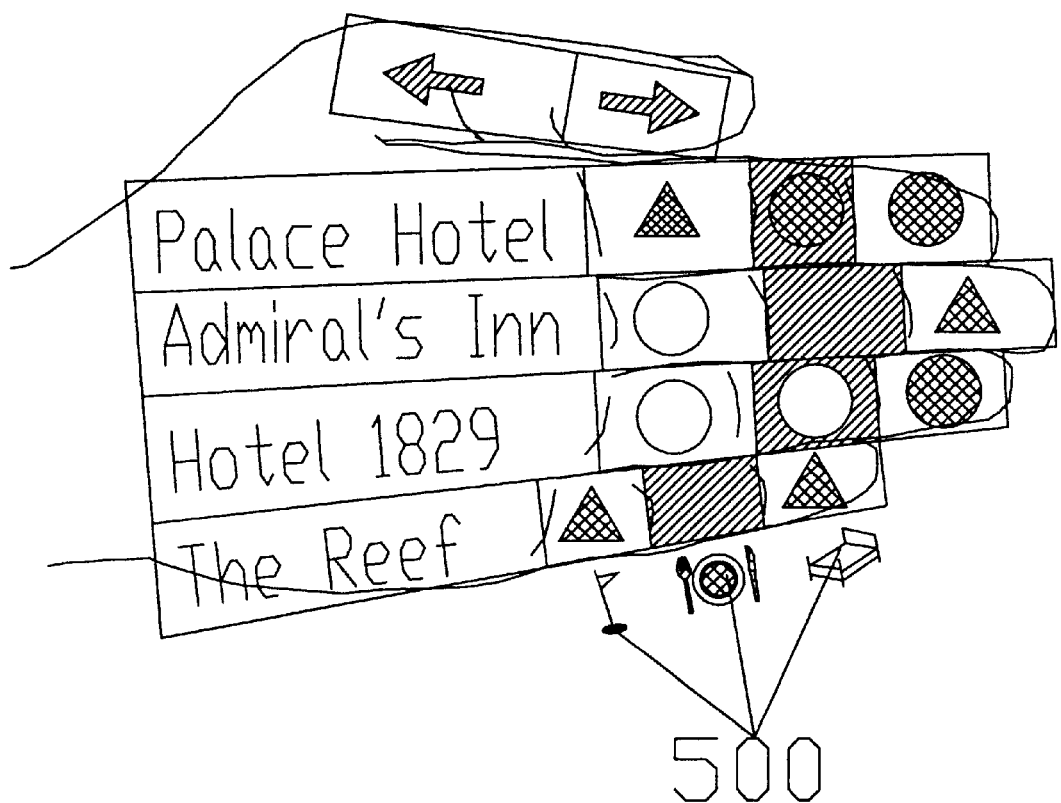
FIG. 6 shows the use of QFD symbols in the user interface.

FIG. 6 shows a different menu of the user interface. The menu is a table that shows different attributes for the columns. The attributes are standard symbols. Clicking on a column reorders the column with the specified column content. Different QFD symbols (Quality Function Deployment) are used. The QFD symbols show the extent to which a specified row is related to the column symbol (which represents a classification). In this way the user can browse the information accordingly. That is explained more in Quality function deployment: integrating customer requirements into product design, Akao, Yoji, Productivity Press, Cambrige, Mass. 1990, ISBN: 0-915299-41-0, Page: 6–7, 20 and 22, which is incorporated herein by reference.

The arrangement of FIG. 6 can be used, for example, when a user travels to a new place. The user can be interested in travelling, food and night life, as shown by a row of symbols 500 below the forefinger in FIG. 6. In such a case it is possible to utilize for example a QFD-based (Quality Function Deployment) micro browser and a symbol display. When the device is a cellular phone according to the invention, the phone retrieves information about the place for example from the Internet, and thereafter compares the obtained information to the interests of the user and indicates the result of the comparison with a few symbols. The best result is denoted for example by a white circle, the second best by a circle marked with lines and a weak result is denoted by a triangle. In other words, when the correlation between the desired service and the interests of the user is high, the display shows a white circle, as seen in the intersection of the first row (Palace Hotel) and the second column (food). In this embodiment the thumb is in a horizontal position, which means that augmented reality arrows situated on the image of the thumb can be used to browse the columns left or right.

The efficiency of the arrangement according to the invention is highly dependent on the Mobile Augmented Reality Interface Sign Interpretation Language (MARISIL) that provides different browsing extensions for use in the interface. MARISIL sign language is defined here in this patent application. The sign language speeds up the input. In order to make the use more ergonomic, it is possible to use a combination of gestures that are detected by the computer as extra inputs. In the following, the most important gestures of the sign language will be discussed.

Enabling the interface is defined by a gesture of placing the palm panel in front of the face at a distance from which it is possible to normally read a text. The palm is defined as a palm panel on which the interface is laid using augmented reality techniques. The area is determined by the cameras or by augmented reality equipment. Disabling the interface is defined by removing the palm panel from the sight of the camera.

The undo command is implemented when the user is doing a fast disable and enable gesture, i.e. when he removes the palm panel hand and replaces it in the area. Doing faster than the camera frame grabbing speed the gesture might not be detected.

Selecting the items to be displayed in the interface is defined by placing the pointer on the item. The item is defined as a virtual object that has an augmented reality image superimposed on the palm panel. The "item" exists only in the augmented reality world. Only the user sees the interface. Other users cannot see the contents of the interface unless they have access to the interface.

An easy pointer for browsing the interface is for example the forefinger of the opposite hand. The opposite hand refers to the user's hand that is other than the palm panel hand. The pointer is not restricted to the forefinger.

Deselecting the items displayed as selected in the interface is defined by placing the pointer over the selected items.

Multiple selection of the items displayed in the interface is defined by the gesture of placing the forefinger and thumb, which are linked at their fingertips, on the item. The "item" exists only in the Augmented World and will be selected and included into the list of selected items. Only the user sees the interface. Other users can not see the content of the interface unless they have access to the interface.

Multiple deselection of the items selected in the interface is defined by the gesture of placing the forefinger and the thumb, which are linked at their fingertips, on the item that is selected and will be deselected from the list after this gesture.

Figure 7:
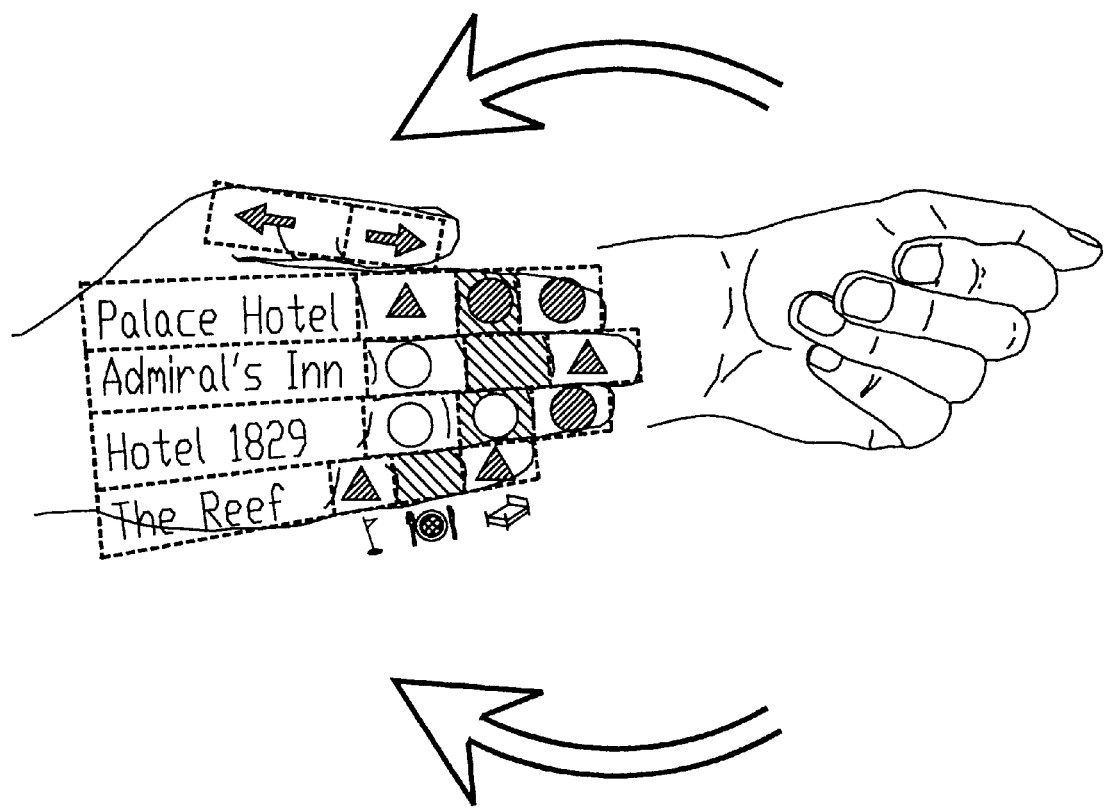
FIG. 7 shows one gesture of sign language.

Opening the items displayed in the interface is defined by the gesture of opening and closing the palm panel in a predefined time (FIG. 7). The predefined time has to be shorter than the predefined time for closing items.

Closing an open item displayed in the interface is defined by the gesture of opening and closing the palm panel in a predefined time. The predefined time has to be longer than the predefined time for opening items.

Starting a phone call in the interface is defined by the gesture of placing the pointer over the lower part of the thumb of the panel palm. The thumb is in a phone mode. The thumb is divided into segments as shown in 4A and 6, which means that lower segment means start the call and upper segment means close the call. The call will be directed to the selected number.

Closing a phone call in the interface is defined by the gesture of placing the pointer over the lower part of the thumb of the palm panel. The interface is in phone mode. Therefore the thumb has to be overlaid with segments indicating the phone mode (FIG. 4A).

Up and down commands are shown in FIG. 5. The up command is defined by the gesture of placing the pointer over the upper part of the thumb that is perpendicular to the palm. The thumb is the one corresponding to the palm panel. The thumb has to be overlaid with segments indicating a browsing up/down mode (i.e. the thumb is perpendicular to the palm). The down command is defined by the gesture of placing the pointer over the lower part of the thumb that is perpendicular to the palm and the down command is used for moving a list of items downward. The thumb corresponds to the palm panel. The thumb has to be in the browsing up/down mode (i.e. the thumb is perpendicular to the palm).

Right and left commands are shown in FIG. 6. The right command is defined by the gesture of placing the pointer over the upper part of the thumb that is parallel to the palm, and it is used for moving a list of items to the right. The thumb is the one corresponding to the palm panel. The thumb has to be in a browsing left/right mode (i.e. the thumb is parallel to the palm). The left command is defined by the gesture of placing the pointer over the lower part of the thumb that is parallel to the palm, and it is used for moving a list of items to the left. The thumb is the one corresponding to the palm panel. The thumb has to be in the browsing left/right mode (i.e. the thumb is parallel to the palm).

Fast key selection is defined by the use of the thumb of the palm panel to point certain segments on the other fingers of the same hand. If the thumb is overlaid with segments indicating the phone mode, the user will make a speed call by using a well-known speed-dial method using one number to index table to contain full phone number as it is commonly used in mobile phones. If the thumb is overlaid with segments indicating the browse mode, the user is able to select a specific symbol to obtain details or to get help. If it is in the writing mode, the user is able to select letters by using this method.

Figure 8:
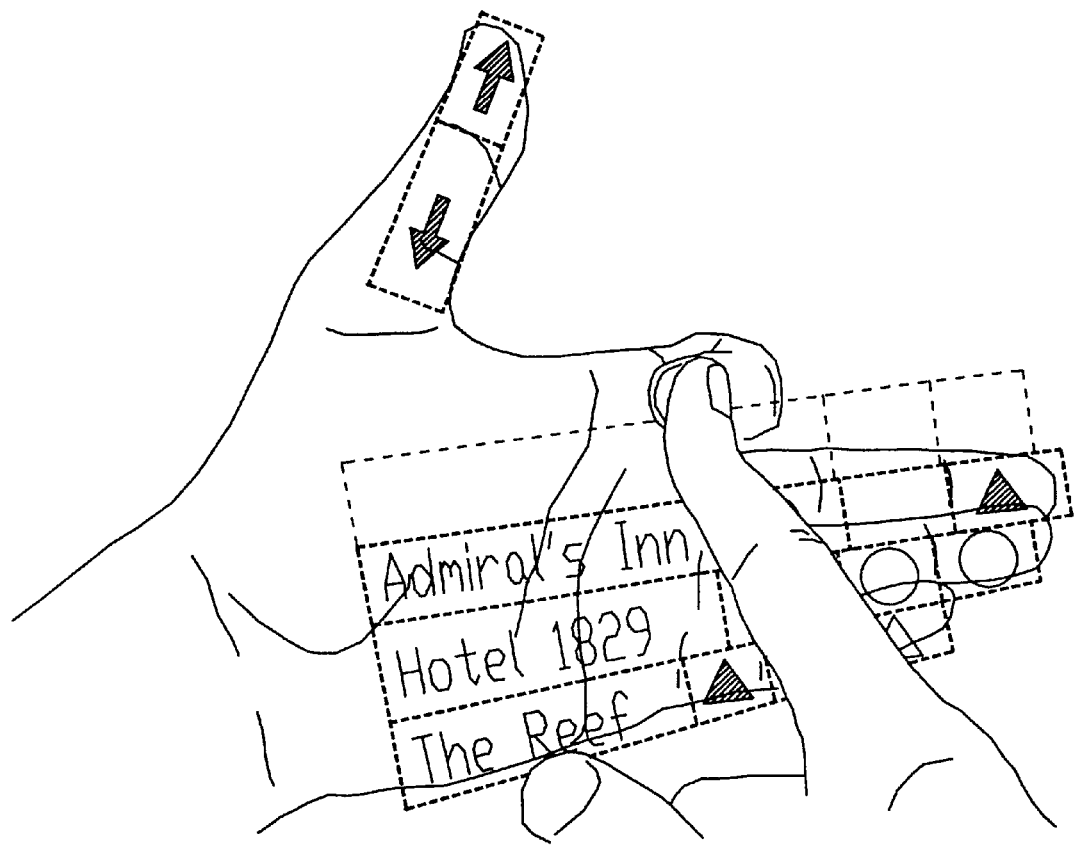
FIG. 8 shows one gesture of sign language.

Removing a row is defined by contracting the corresponding finger of the row matrix (FIG. 8). The operation could be difficult for some users, wherefore we recommend the use of the pointer instead. With this command the user can deselect one row or put it in some other table. The result of this action depends on the interface that the user is using (i.e. if the user is in a phonebooktype interface, the action could mean the selection of the preferred phone to make a call, etc.).

Figure 9:
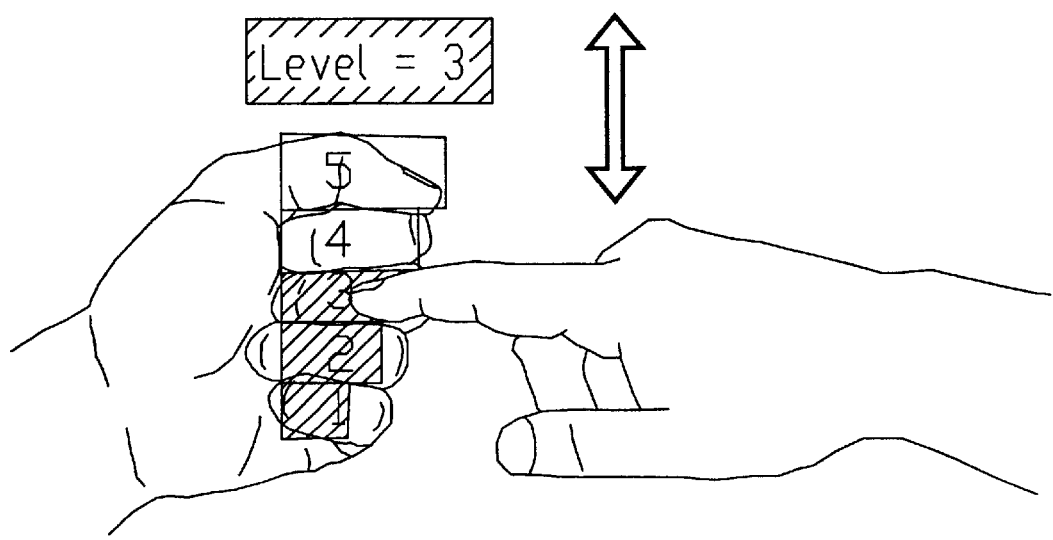
FIG. 9 shows one gesture of sign language.

The command of setting up the a level is defined by making a fist with the palm panel so that the outside part of the finger is perpendicular to the user's face (FIG. 9). This action enables a level interface. The user can select a proper level by choosing one of the four backsides of the fingers from the palm panel.

By definition the interface is not viewable by any other person than the user. The user can select the secured version of the interface and the interface can have the numbers or letters place randomly on the palm panel such that other people do not know the real value introduced by placing the pointer finger on the palm panel. That is described in a U.S. Pat. No. 5,677,700, which is incorporated herein by reference.

The device is easy to update for use in a flammable environment. If the parts of the interface are encased in a plastic cover and closed hermetically, the interface can be used under water. Or the interface can be used in other environments, such as gas stations, where there is an imminent danger of a shortcut causing an explosion. The interface can also be used in environments where the user's hands cannot be uncovered (i.e. astronauts or deep-sea scuba divers).

What is claimed is:

1. A method of using a portable mobile communication device, the method comprising:

forming an image of a physical hand of a user and recognizing a natural partition of the user's physical hand;

forming an augmented reality image by overlaying an image of a desired user interface on an image of the user's physical hand formed by rays of light originating from the user's physical hand and entering the user's eyes;

selecting a desired segment by touching a suitable partition on the user's physical hand, the segment being recognized as a natural partition of the user's physical hand; and performing a function related to the segment in the device.

2. A method according to claim 1, wherein the desired segment is selected by the user.

3. A method according to claim 1, wherein the image of the desired user interface, overlaid on the image of the user's physical hand recognized by the user with his eyes, is formed by means of digital signal processing from data provided by virtual reality gloves.

4. A method according to claim 1, wherein the user interface is an alphanumerical user interface.

5. A method according to claim 1, wherein the user interface is an interface based on QFD symbols.

6. A method according to claim 1, wherein the image of the user's physical hand is formed as a video image.

7. A method according to claim 1, wherein the image of a desired user interface consists of computer graphics.

8. A method according to claim 1, wherein the user interface comprises input segments and is situated on the image of the user's physical hand in such a way that the segments of the user interface are separated from each other by the natural partition of the user's physical hand.

9. A method according to claim 1, wherein the device is operated by means of MARISIL sign language.

10. A method of using a portable mobile communication device, the method comprising:

forming an image of a physical hand of a user and recognizing the a natural partition of the user's physical hand;

forming an augmented reality image of a user interface of the device by overlaying an image of a desired user interface on the image of the user's physical hand;

showing a user the augmented reality image of the user interface;

selecting a desired segment by touching a suitable partition on the user's physical hand, the segment being recognized as a natural partition of the user's physical hand;

recognizing the selection on the user's physical hand; and performing a function related to the segment in the device.

11. A method according to claim 10, wherein the desired segment is selected by the user.

12. A method according to claim 10, wherein the image of the desired user interface, overlaid on the image of the user's physical hand, is formed by means of digital signal processing from data provided by virtual reality gloves.

13. A method according to claim 10, wherein the user interface is an alphanumerical user interface.

14. A method according to claim 10, wherein the user interface is an interface based on QFD symbols.

15. A method according to claim 10, wherein the image of the user's physical hand is formed as a video image.

16. A method according to claim 10, wherein the image of a desired user interface consists of computer graphics.

17. A method according to claim 10, wherein the user interface comprises input segments and is situated on the image of the user's physical hand in such a way that the segments of the user interface are separated from each other by the natural partition of the user's physical hand.

18. A method according to claim 10, wherein the device is operated by means of MARISIL sign language.

19. A portable mobile communication device comprising a video camera unit, a display unit, a transceiver unit and a digital signal processing unit that is arranged to control the operation of the portable mobile communication device, wherein:

the video camera is arranged to form a video image of a user's physical hand and to feed the image into the digital signal processing unit, which is arranged to recognize a natural partition of the user's physical hand in the video image;

the digital signal processing unit is arranged to feed an image of a user interface into the display and to form an augmented reality image of the user interface of the device by overlaying an image of a desired user interface on an image of the user's physical hand formed by rays of light originating from the user's physical hand, passing through the display, and entering the user's eyes;

a desired segment, recognized as a natural partition of the user's physical hand, is selected by the user by touching a suitable partition on the user's physical hand;

the digital signal processing unit is arranged to recognize the selection on the user's physical hand; and the device is arranged to perform a function related to the segment.

20. A device according to claim 19, wherein the user selects a desired segment.

21. A device according to claim 19, wherein the user interface is an alphanumerical user interface.

22. A device according to claim 19, wherein the user interface is an interface based on QFD symbols.

23. A device according to claim 19, wherein the image of a desired user interface consists of computer graphics.

24. A device according to claim 19, wherein the user interface comprises input segments and is situated on the image of the user's physical hand in such a way that the segments of the user interface are separated from each other by the natural partition of the user's physical hand.

25. A device according to claim 19, wherein the device is arranged to operate by means of MARISIL sign language.

26. A portable mobile communication device comprising a video camera unit, a display unit, a transceiver unit and a digital signal processing unit that is arranged to control the operation of the portable mobile communication device, wherein:

the video camera is arranged to form a video image of a user's physical hand and to feed the image into the digital signal processing unit, which is arranged to recognize a natural partition of the user's physical hand in the video image;

the digital signal processing unit is arranged to form an augmented reality image of a user interface of the device by overlaying an image of a desired user interface on the image of the user's physical hand;

the digital signal processing unit is arranged to feed the augmented reality image of the user interface into the display, which is arranged to show the image to the user;

a desired segment, recognized as a natural partition of the user's physical hand, is selected by the user by touching a suitable partition on the user's physical hand;

the digital signal processing unit is arranged to recognize the selection on the user's physical hand; and the device is arranged to perform a function related to the segment.

27. A device according to claim 26, wherein the user selects a desired segment.

28. A device according to claim 26, wherein the user interface is an alphanumerical user interface.

29. A device according to claim 26, wherein the user interface is an interface based on QFD symbols.

30. A device according to claim 26, wherein the image of a desired user interface consists of computer graphics.

31. A device according to claim 26, wherein the user interface comprises input segments and is situated on the image of the user's physical hand in such a way that the segments of the user interface are separated from each other by the natural partition of the user's physical hand.

32. A device according to claim 26, wherein the device is arranged to operate by means of MARISIL sign language.

33. A portable mobile communication device comprising a virtual reality gloves unit, a position tracking unit, a display unit, a transceiver unit and a digital signal processing unit that is arranged to control the operation of the portable mobile communication device, wherein:

the virtual reality gloves are arranged to feed information on a user's physical hand into the digital signal processing unit, which is arranged to form an image of the user's physical hand and to recognize a natural partition of the user's physical hand;

the digital signal processing unit is arranged to form an augmented reality image of a user interface of the device by overlaying an image of a desired user interface on the image of the user's physical hand;

the digital signal processing unit is arranged to feed the augmented reality image of the user interface into the display, which is arranged to show the image to the user;

a desired segment, recognized as a natural partition of the user's physical hand, is selected by the user by touching a suitable partition on the user's physical hand;

the digital signal processing unit is arranged to recognize the selection on the user's physical hand; and the device is arranged to perform a function related to the segment.

34. A device according to claim 33, wherein the user selects a desired segment.

35. A device according to claim 33, wherein the user interface is an alphanumerical user interface.

36. A device according to claim 33, wherein the user interface is an interface based on QFD symbols.

37. A device according to claim 33, wherein the image of a desired user interface consists of computer graphics.

38. A device according to claim 33, wherein the user interface comprises input segments and is situated on the image of the user's physical hand in such a way that the segments of the user interface are separated from each other by the natural partition of the user's physical hand.

39. A device according to claim 33, wherein the device is arranged to operate by means of MARISIL sign language.

* * * * *